Oct. 30, 1962   G. A. MARSH ETAL   3,060,721
APPARATUS FOR TESTING LUBRICANTS
Filed June 30, 1959
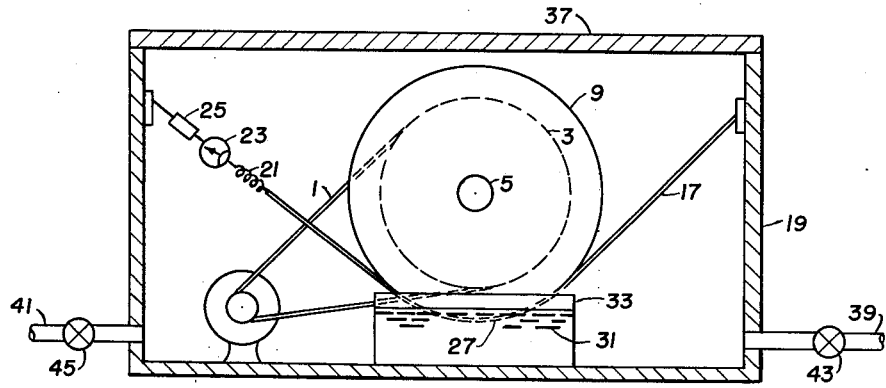
FIG. I
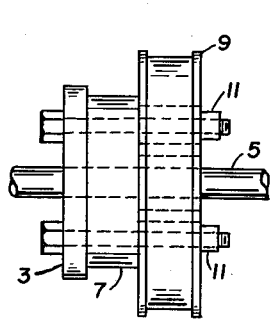
FIG. 2
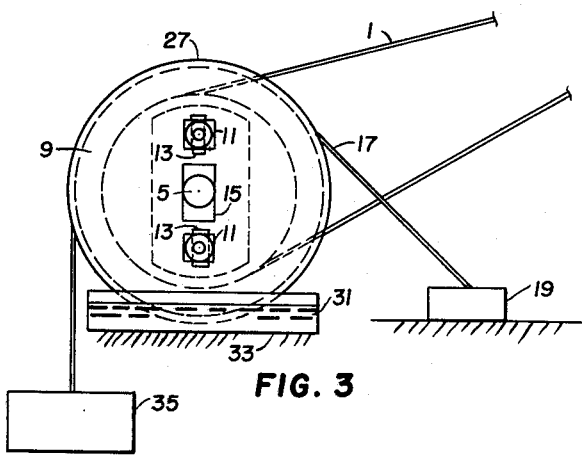
FIG. 3
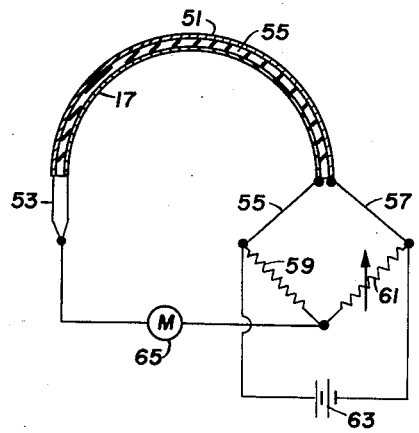
FIG. 4
INVENTORS
GLENN A. MARSH
BY EDWARD SCHASCHL
Edward H. Fang
ATTORNEY

United States Patent Office 3,060,721
Patented Oct. 30, 1962

3,060,721
APPARATUS FOR TESTING LUBRICANTS
Glenn A. Marsh and Edward Schaschl, Crystal Lake, Ill., assignors to The Pure Oil Company, Chicago, Ill., a corporation of Ohio
Filed June 30, 1959, Ser. No. 824,015
13 Claims. (Cl. 73—10)

This invention relates to an apparatus for determining a performance characteristic of lubricants, such as oils and greases, designed to reduce wear between moving metal parts of machinery. More particularly, this invention relates to an apparatus to measure simultaneously the effects of wear, cyclic stress, and corrosion upon a metallic test specimen.

Many elements of mechanical equipment, such as the cam shafts and cam followers in internal combustion engines are subjected to sliding friction and cyclic stress variations during operation. At the same time, these elements are subjected to the corrosive influences of the combustion products of the engine. These three phenomena, cyclic stress, corrosion, and wear, are all interrelated. Cyclic stress produces conditions of fatigue which increase the rate of wear or attrition of a metal surface. Cyclic stress also produces points of minute fracture and failure, and it is known that corrosion at such points proceeds at an unusually rapid rate. Corrosion itself produces pits and roughness which result in an increase in the rate of wear. Corrosion pits are also sites of abnormal stress distribution, and the unusually high stresses occurring in the metal adjacent to such pits produce early fracture and failure of the member. Lubricants employed to reduce friction between moving parts may either increase or inhibit corrosion, depending upon their composition.

No satisfactory apparatus has been available in the past for laboratory evaluations of the protection afforded by various lubricants under operating conditions, or for inexpensively ascertaining the benefits or deficiencies attendant with the use of various combinations of metals in mating sliding surfaces.

It is an object of this invention to provide an apparatus for measuring the wear of test specimens under conditions of sliding friction, cyclic stress, and exposure to corrosive environment, and the effects of various lubricants thereon.

It is another object of this invention to provide a device by which the effects of such wear can be conveniently determined by measuring the change in the electrical resistance produced by wear or attrition of a test specimen.

It is yet another object of this invention to provide a novel test specimen for use with the apparatus of this invention, such that the errors introduced by variations in temperature of the test specimen in the measurement of the electrical resistance of said specimen are substantially eliminated.

Briefly, the apparatus of this invention provides an eccentric rotating surface and means for supporting a strip-like test specimen so that at least a portion of the periphery of said eccentric rotating surface bears against and rubs the test specimen, and induces cyclic tensile stresses therein. The test specimen and rotating surface are enclosed in a suitable vessel which is provided with inlet and outlet means, such that a controlled corrosive environment can be caused to exist within the vessel. Means are provided for continuously applying lubricant to the contact surface between the strap-like test specimen and the rotating surface.

This invention is best described in connection with the drawings, of which:

FIGURE 1 is a front elevational view of the apparatus of this invention.

FIGURE 2 is a left-side elevational view of FIGURE 1 showing the details of how the eccentric rotating surface may be supported.

FIGURE 3 is a front elevational view of an alternate embodiment of this invention.

FIGURE 4 is a detailed view of a test specimen suitable for use with the apparatus of FIGURE 1, and an electrical circuit which may conveniently be used to measure the change in resistance of the test element produced by wear.

Belt 1 is powered by suitable means, such as an electric motor, and drives pulley 3 on axle 5. Mounted against hub 7 of pulley 3 is wear-drum 9. Drum 9 may be mounted to have any desired degree of eccentricity with respect to shaft 5. Studs 11 are secured firmly in hub 7, and protrude from the shoulder of the hub to pass through elongated slots 13 in drum 9. Drum 9 is also provided with an elongated central opening 15 which surrounds axle 5, and which, together with slots 13, permits radial movement of the drum relative to shaft 5 to provide the desired eccentricity between shaft 5 and the periphery of drum 9.

Bearing against a portion of the peripheral surface of drum 9 is wear-test specimen 17 which is preferably metallic and fabricated as a wire, ribbon, strap, or other flexible form. One end of specimen 17 is securely fastened or anchored to machine base 19, and a force of predetermined magnitude is applied to the other end of the test specimen by means of spring 21, tensiometer 23, and turnbuckle 25, which turnbuckle is also secured to machine base 19. Bearing area 27, between specimen 17 and drum 9, is coated by immersion in lubricant 31 contained in reservoir 33. The reservoir is supported by machine base 19.

Alternatively, spring 21, tensiometer 23, and turnbuckle 25 may be replaced by weight 35, which is of known magnitude, as shown in FIGURE 3. Cover 37 cooperates with machine base 19 and front and rear panels (not shown) to form an enclosure around the apparatus. It is not essential that the whole apparatus be so enclosed, but suffices if the contact area between drum 9 and test specimen 17 is so enclosed. This permits tests to be run in controlled inert, corrosive, or other atmospheres. In any event, the vessel thus formed is provided with an inlet 39 and an outlet 41, both of which are preferably controlled by valves, such as valves 43 and 45.

In using the apparatus, specimen 17 is placed in position on drum 9, the desired degree of eccentricity is provided by properly positioning drum 9 with respect to pulley-hub 7 and shaft 5. The desired amount of tension, as indicated by tensiometer 23, is applied to test specimen 17 by rotating turnbuckle 25. The lubricant to be studied is placed in receptacle 33 and shaft 5 is rotated. The apparatus may be allowed to run for a preselected period of time, or until the test specimen breaks or is worn through.

As eccentric drum 9 rotates and becomes positioned so as to stretch spring 21, the tensile stress in the test specimen is increased. When the drum rotates to a position such that the lower portion of the eccentrically-mounted drum is in contact with the test specimen, spring 21 contracts and the tension applied to the test specimen is decreased. It is apparent that cyclic stress is produced in the test specimen, and the magnitude of the fluctuations in the applied stress is dependent upon the magnitude of the eccentricity of drum 9 and the extent of the force required to expand spring 21. The specimen is subjected to continuous friction against the periphery of rotating drum 9, and since the magnitude of the friction force is dependent, in part, upon the magnitude of the normal force between the drum and test specimen, it is evident that the applied friction is also cyclic.

After the specimen has been worn for a desired period of time, the apparatus is stopped and the test specimen is removed to determine the amount of wear by means of microscopic or micrometric measurement. Alternatively, wear can be measured by measuring the increase in the resistance of the test specimen during the period over which it was subjected to wear. As metal is removed from the test specimen, its cross-sectional area is decreased, and the electrical resistance of the test specimen is thereby proportionately increased. The electrical resistance of the test element is measured before and after the wear period by means of known electrical resistance-measurement devices and techniques. Since the total change in resistance is small, it is necessary that a high degree of accuracy be obtained in making the resistance measurements.

FIGURE 4 is a schematic view of the electrical circuit which may be used to measure the wear on test specimen 17. Test specimen 17 and compensating specimen 51 are electrically connected in series, either by physically joining the two specimens or by joining them electrically by means of a conductor, such as conductor 53. Conductors 55 and 57 are connected, respectively, to the other terminal ends of test specimen 17 and compensating specimen 51. These conductors connect the aforenamed specimens to resistance 59 and variable resistance 61, which together with the test specimen and compensating specimen form a Wheatstone bridge. Test specimen 17, compensating specimen 51, resistance 59, and variable resistance 61, each provide one arm of the Wheatstone bridge. The four arms of the bridge are serially connected, and the test specimen and compensating specimen are placed in adjacent arms. A suitable voltage source, 63, which may be a battery, is connected across two opposite corners of the bridge circuit. A suitable instrument for measuring voltage, such as galvanometer 65, is connected across the remaining two corners of the bridge circuit, the four corners of the circuit being defined by the points of junction between the four serially-connected arms of the bridge. Removal of metal by wear from test specimen 17 causes an increase in the resistance in this branch of the bridge circuit, which produces a corresponding proportional deflection of galvanometer 65.

Although it is possible to measure the change in the resistance of test specimen 17 directly, as by an ohmmeter, this method is usually unsatisfactory because of the need for keeping the temperature of the test specimen at a known constant value. However, instances will arise where the temperature may remain constant during the test period, or under some circumstances it may be possible to return a test specimen to its exact initial temperature after it has been subjected to wear. In such cases it will not be necessary to use the circuit of FIGURE 4. Instead, any accurate ohmmeter may be used to measure the resistance of the test specimen, and the compensating specimen may be omitted. In Table I are compiled resistance values at different temperatures for a coupon of steel, 0.125″ x 3.0″. Also included are the variations in resistance of the same coupon of steel after a change in the resistance of the coupon has been produced by removal of metal from the coupon amounting to a weight loss of 10%.

TABLE I

|  | Temperature, ° F. | | | | |
| --- | --- | --- | --- | --- | --- |
|  | 0° | 32° | 68° | 85° | 100° |
| Resistance of coupon, in ohms | 0.0706 | 0.0807 | 0.0925 | 0.0980 | 0.1030 |
| Resistance of coupon after 10% weight loss, in ohms | 0.0785 | 0.0897 | 0.1029 | 0.1090 | 0.1145 |

It can be seen from these measurements that temperature has such a significant effect on resistance that lubricant evaluation studies employing resistance measurements are not reliable unless exact compensation is made for the variation in temperature occurring during the duration of the test. Such a test may last for hours, or even days. Furthermore, the small changes that occur in the resistance of the test specimen as it is subjected to wear preclude ignoring the temperature factor as unimportant. Accordingly, this invention provides an electric measuring-circuit whereby automatic temperature compensation is provided which cancels the effect of temperature variations.

Test specimen 17 and compensating specimen 51 are electrically connected in series, either by physically joining the two elements or by joining them electrically by means of a conductor, such as conductor 53. The two metallic elements are secured together by means of a thin film 55 of electrically-insulating, resilient adhesive. Any one of the numerous electrically-insulating, commercially-available adhesives may be used. Epoxy resins are preferred because of their high tensile strength. The adhesive preferably should have a reasonably high coefficient of thermal conductivity.

In using the apparatus for lubricant evaluation studies, variable resistance 61 is adjusted until meter 65 shows that no current is flowing. At this point, the resistance of test specimen 17 can be determined by the following formula:

$$R_{17} = \frac{R_{51} \times R_{59}}{R_{61}}$$

By comparing the resistance measurements thus made with previously-prepared, calibrated tables, the loss of weight or loss of thickness caused by wear can be readily determined.

As a practical matter, it is possible to evaluate a group of lubricants by subjecting a series of identical test specimens to wear in the presence of the various lubricants to be evaluated. Each test specimen should be made of the same material and have the same resistance characteristics. In each case, the variable resistance must be adjusted to give a zero galvanometer deflection at the begining of the test. Each test specimen in turn is subjected to wear, the wearing process is discontinued, and sufficient time is allowed to elapse so that the test specimen and the compensating specimen will come to the same temperature. The specimens of course need not, and in most cases will not, return to the exact temperature that existed before the test had begun. The extent of deflection of the galvanometer, after the specimens have come to a common temperature, is proportional to the amount of metal removed from each test specimen, respectively. By comparing the deflection of the galvanometer for each test specimen, the extent of wear, and therefore the usefulness, of each lubricant tested can be determined. The best lubricant will, of course, produce the smallest galvanometer deflection.

Any change in temperature brings about a change in the resistance of a conductive material. The galvanometer in the bridge circuit of FIGURE 4 will show no deflection if specimens 17 and 51 at the same time proportionally increase or decrease in resistance. Therefore, specimen 51 compensates specimen 17 for changes of temperature. It is important that the two specimens be at the same temperature at the time measurements are taken and when the bridge is initially adjusted to give a zero galvanometer deflection. Thermoelectric effects at the junctions between test specimen 17 and compensating specimen 51 and the lead wires to the bridge are minimized by the fact that as along as the specimens are both made of the same material, and the conductors are both made of the same material, preferably copper, the thermoelectric effects are compensating and cancel each other.

Although the apparatus is suitable for use in the simplest form described above, it is preferred that some expedient be provided which will permit the direct reading of loss of metal thickness by wear without the need for referring to previously calibrated tables. Lynn E. Ellison, in U.S. Patent 2,830,265, describes an electric resistance-change meter for conveniently detecting and measuring changes in resistance, which provides a direct reading of the rate of the wear. The meter of Ellison employs a bridge circuit similar to that shown in FIGURE 4, in conjunction with relatively complex electronic circuits to accomplish his purpose. Specimens 17 and 51 may be connected to the electric resistance-change meter of Ellison in the same way that they are connected in the bridge circuit of FIGURE 4. The temperature-compensation function of both measuring circuits is identical.

The test specimen and the compensating specimen preferably should have substantially the same resistivity. Although advantages accrue in constructing the test specimen from materials having the same resistance values, suitable unsymmetrical specimens can be fashioned in which the resistance of these specimens is not identical, provided, for the sake of consistency, a material of construction is employed which is substantially uniform in composition and resistivity. In general, the resistance of the test specimen to the resistance of the compensating specimen expressed as a ratio, may vary from values of about 0.1 to 10. Although the values of these ratios of resistances may vary over wide limits, it is well known to those skilled in the art that as a practical matter there are numerous electrical factors which have to be taken into consideration in the design of suitable resistance elements. Of primary importance is the factor of temperature compensation. By using test elements which have substantially the same resistivity, the apparatus functions accurately when connected to the bridge-measuring circuit without the necessity for tedious calibration.

Because the sensitivity of the measuring instrument is related to the original thickness of the test specimen, the first step in selecting proper test-specimen dimensions is to ascertain the minimum metal loss to be detected. Then, knowing the sensitivity of the instrument in relation to initial thickness, the requisite initial thickness can be determined. For example, when the minimum detectable metal loss is to be 10 microinches, using an instrument sensitive to 0.02% of the original metal thickness, the test specimen must be $10 \times 10^{-6}$ divided by 0.0002, or $5 \times 10^{-2}$ (0.05) inch thick. When the thickness has been established, the length-to-width ratio of the specimen is dictated by the total-element resistance at which the instrument is to operate. Best results are obtained when the thickness of the test specimen is not greater than 0.10 inch, and the specimen has a ratio of width-to-thickness in excess of 10 to 1, and a ratio of length-to-cross-section in excess of 100 to 1.

The novel test strap which comprises test specimen 17, compensating specimen 51, and electrically insulating adhesive film 55 is peculiarly suited to use with the apparatus of this invention. By maintaining the test element and compensating element in intimate but elecrically-insulated relationship, the two specimens quickly come to the same temperature after drum 9 has come to a stop. If desired, drum 9 itself may be made of an electrically-insulating material, or may be coated with an electrically-insulating material, in which case it is not necessary to remove the test strap from around the drum before making electrical-resistance wear measurements. When using a composite strap, such as that shown in FIGURE 4, it is necessary to allow for the cross-section of the compensating element when calculating the cyclic stresses which will be imposed on the test specimen by the rotating, eccentric drum.

What is claimed is:

1. An apparatus for evaluating a lubricant comprising a base member, a shaft rotatably supported by said base member, a drum mounted on said shaft, said drum having a periphery eccentric with respect to said shaft, means for rotating said shaft and drum, means supported by said base engageable with one end of a strap-like test specimen to secure said specimen, means engageable with the other end of said specimen for applying tension thereto when said specimen is secured by said first-named engaging means and the center portion of said specimen encompasses and lies in contact with at least a portion of the periphery of said drum and means for measuring the change in resistance of the strap-like test specimen when said test specimen is subjected to wear.

2. An apparatus according to claim 1 including means for applying lubricant continuously to the wear surface between said specimen and drum.

3. An apparatus according to claim 2 in which the ends of said test specimen are operably connected to said base member through a spring and a turnbuckle.

4. An apparatus according to claim 3 in which at least said drum and the portion of said test specimen in contact with said drum is enclosed in a hermetically sealable vessel, said vessel being equipped with inlet and outlet means for providing a controlled corrosive atmosphere therein.

5. An apparatus according to claim 4 in which said drum is cylindrical and includes radial, outwardly-extending flanges along both edges of its periphery, and said drum is eccentrically supported on said shaft.

6. An apparatus according to claim 5 in which said drum is mounted on said shaft by means of a hub, said hub being secured to said shaft and supporting a plurality of studs, said studs being substantially parallel with said shaft and mating with and passing through a plurality of elongated, parallel slots in said drum, so as to permit radial movement of said drum relative to said shaft in the direction of the parallel, elongated slots, and nut means cooperating with said studs for securing the drum to the hub.

7. An apparatus according to claim 1 in which said means for measuring the change in resistance of the strap-like test specimen comprises a second compensating specimen having a temperature-resistance characteristic similar to that of said test specimen, said compensating specimen being supported in electrically-insulated relationship to said test specimen, and electrical circuit-means comprising a bridge circuit having four serially-connected arms, the strap-like test specimen and said compensating specimen being connectable in two mutually adjacent arms of said circuit, other resistances connected in the other two arms, respectively, of said circuit, electrical potential-measuring means connected between two opposite corners of said bridge circuit and a potential source connected between the two remaining corners of said bridge circuit, said corners being defined by the junctions of said four arms.

8. An apparatus for evaluating a lubricant comprising a base member, a shaft rotatably supported by said base member, adjustable means for mounting a drum on said shaft whereby to adjust the degree of eccentricity of said drum relative to said shaft, a drum secured to said shaft through said adjustable means, means for rotating said shaft and drum, means supported by said base engageable with one end of a strap-like test specimen to secure said specimen, and means engageable with the other end of said specimen for applying tension thereto when said specimen is secured by said first-named engaging means and the center portion of said specimen encompasses and lies in contact with at least a portion of the periphery of said drum.

9. An apparatus for evaluating a lubricant comprising a base member, a shaft rotatably supported by said base member, a drum, a hub secured to said shaft and supporting a plurality of studs, said studs being substantially parallel with said shaft and mating with and passing through a plurality of elongated parallel slots in said drum, so as to permit radial movement of said drum relative to said shaft in the direction of the parallel, elongated slots, nut means cooperating with said studs for securing the drum to the hub, means for rotating said shaft and drum, means supported by said base engageable with one end of a strap-like test specimen, means engageable with the other end of said specimen for applying tension thereto when said specimen is secured by said first-named engaging means, and the center portion of said specimen encompasses and lies in contact with at least a portion of the periphery of said drum, and means for applying lubricant continuously to the wear surface between said specimen and drum.

10. An apparatus for evaluating a lubricant comprising a strap-like test element comprising two thin, flexible, ribbon-like, metallic resistance specimens having a ratio of length-to-cross-section in excess of about 100 to 1, a ratio of width-to-thickness in excess of about 10 to 1, and a thickness of less than about 0.10 inch, supported flat upon opposite faces of a similarly shaped layer of electrically insulating material, the external surface of a said specimen being bare, means for supporting said test element, means for subjecting said bare specimen to mechanical friction in the presence of the lubricant to be evaluated, and electrical means for measuring a change in the ratio of the resistances of said specimens.

11. An apparatus for evaluating a lubricant comprising a strap-like test element comprising two thin, flexible, ribbon-like, metallic resistance specimens having a ratio of length-to-cross-section in excess of about 100 to 1, a ratio of width-to-thickness in excess of about 10 to 1, and a thickness of less than about 0.10 inch, said specimens being bonded together with their respective flat surfaces adjacent to each other, but separated by a thin layer of electrically insulating adhesive material, the external surface of a said specimen being bare, means for supporting said test element, means for subjecting said bare specimen to mechanical friction in the presence of the lubricant to be evaluated, and electrical means for measuring a change in the ratio of the resistances of said specimens.

12. A test element in accordance with claim 11 in which said specimens have a similar temperature-resistance characteristic.

13. A test element in accordance with claim 12 in which said specimens are both fabricated of the same material.

References Cited in the file of this patent

UNITED STATES PATENTS

| | | |
|---|---|---|
| 1,825,725 | Gonder | Oct. 6, 1931 |
| 2,323,175 | Young et al. | June 29, 1943 |
| 2,337,414 | Rieber | Dec. 21, 1943 |
| 2,373,115 | Graves | Apr. 10, 1945 |
| 2,712,591 | Rogell | July 5, 1955 |
| 2,824,283 | Ellison | Feb. 18, 1958 |
| 2,891,204 | Kuhn | June 16, 1959 |
| 2,910,863 | Hornbostel et al. | Nov. 3, 1959 |
| 2,970,411 | Trolander | Feb. 7, 1961 |